(12) United States Patent
Nakakura et al.

(10) Patent No.: US 9,524,354 B2
(45) Date of Patent: Dec. 20, 2016

(54) DEVICE, METHOD, AND PROGRAM FOR PROCESSING DATA WITH TREE STRUCTURE

(71) Applicant: International Business Machines Corporation, Armonk, NY (US)

(72) Inventors: Kansaku Nakakura, Tokyo (JP); Koichi Nishitani, Tokyo (JP); Lianzi Wen, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 431 days.

(21) Appl. No.: 14/029,547

(22) Filed: Sep. 17, 2013

(65) Prior Publication Data

US 2014/0172897 A1   Jun. 19, 2014

(30) Foreign Application Priority Data

Sep. 18, 2012 (JP) ................................. 2012-204803

(51) Int. Cl.
*G06F 17/30* (2006.01)
*G06F 7/00* (2006.01)

(52) U.S. Cl.
CPC ... *G06F 17/30923* (2013.01); *G06F 17/30327* (2013.01); *G06F 17/30386* (2013.01)

(58) Field of Classification Search
CPC .................... G06F 17/30908; G06F 17/30923; G06F 17/30327; G06F 17/30386
See application file for complete search history.

(56) References Cited

U.S. PATENT DOCUMENTS

| 8,316,060 B1* | 11/2012 | Snyder, II | G06F 17/30958 707/797 |
|---|---|---|---|
| 2002/0065822 A1* | 5/2002 | Itani | G06F 17/30914 |

(Continued)

FOREIGN PATENT DOCUMENTS

| JP | 2002073589 A | 3/2002 |
|---|---|---|
| JP | 2008305124 A | 12/2008 |

OTHER PUBLICATIONS

Miki, Takeshi, et al.; "Indexing Methods to Extract MCTs from and XML Document Containing Search Keywords"; DEWS; p. 1-6; 2007; with English language abstract.

*Primary Examiner* — Alicia Willoughby
(74) *Attorney, Agent, or Firm* — Cantor Colburn LLP; Joseph Polimeni

(57) ABSTRACT

A system to enable restoration of a tree structure based on serialized data, and extraction of partial data that includes information of the tree structure from original data. A searching part identifies sequence elements of serialized data using a searching process. An essential element string identifying part identifies a sequence element string (essential element string) that includes the searched sequence elements. A rear section identifying part identifies a sequence element string that includes sequence elements located after the essential element string and is required to form a subtree that includes nodes corresponding to all the sequence elements of the essential element string. A front section identifying part identifies a sequence element string that includes sequence elements located before the essential element string and is required to form a subtree that includes nodes corresponding to all the sequence elements of the essential element string.

7 Claims, 14 Drawing Sheets

(a)

| Tree Structure | Text |
|---|---|
| R a e b f g k a e b f g | A B C F O P Q |

(b)

| Tree Structure | Text |
|---|---|
| R a e 1 b f 1 g 1 k 3 a e 1 b f 1 g 4 | A B C F O P Q |

(c)

| Tree Structure | Text |
|---|---|
| R a e 1, b f 1, g 1, k 3, a e 1, b f 1, g 4 | A B C F O P Q |

(56) References Cited

U.S. PATENT DOCUMENTS

| | | | |
|---|---|---|---|
| 2006/0206595 A1* | 9/2006 | Zarzycki | H04L 67/2823 709/220 |
| 2008/0215520 A1* | 9/2008 | Gu | G06F 17/30911 706/48 |
| 2010/0082664 A1* | 4/2010 | Odaira | 707/769 |
| 2013/0086127 A1* | 4/2013 | Pogmore | H04L 9/0869 707/803 |

* cited by examiner (a)

(b)

| Tree Structure | Text |
|---|---|
| R a e b f g k a e b f g | A B C F O P Q |

(a)

| Tree Structure | Text |
|---|---|
| R a e b f g k a e b f g | A B C F O P Q |

(b)

| Tree Structure | Text |
|---|---|
| R a e 1 b f 1 g 1 k 3 a e 1 b f 1 g 4 | A B C F O P Q |

(c)

| Tree Structure | Text |
|---|---|
| R a e 1, b f 1, g 1, k 3, a e 1, b f 1, g 4 | A B C F O P Q |

Tree Structure

Serialized Data

Preorder: abc (b)

Tree Structure

Serialized Data

Preorder: abc (a)

(b)

(c)

| Tree Structure | Text |
|---|---|
| R a c 1, d 2, b 0, e 1, f 3 | A B E C D |

DEVICE, METHOD, AND PROGRAM FOR PROCESSING DATA WITH TREE STRUCTURE

PRIORITY

This application claims priority under 35 U.S.C. §119 to Japan Patent Application No. JP820120025, filed 18 Sep. 2012, and all the benefits accruing therefrom under 35 U.S.C. §119, the contents of which in its entirety are herein incorporated by reference.

BACKGROUND

This disclosure relates to a device, method, and program for processing a structured document (data) with a tree structure such as an XML document or the like, and extracts a desired portion thereof.

Recently, structured documents (data) that are written in a structured language such as XML and the like are widely used in a variety of applications. Information systems that use this type of data include a system that receives a search request from outside, and extracts and returns a portion of the data that corresponds to search conditions. In such a system, there are cases where information of a portion of the structure that the original data has, corresponding to a data portion to be extracted is also requested as a search result.

For example, when performing a keyword search for an XML document with a tree structure, extraction of a tree structure (subtree) that includes text portions corresponding to the keywords is requested in addition to the text portions (partial data or subdata extracted from the original data and including its structure information is hereinafter referred to as "subdocument"). A technique for extracting a desired subdocument from an XML document has been proposed.

SUMMARY

According to an embodiment of the invention, a device that processes data with a tree structure has a searching part that searches serialized the data to identify a number of nodes satisfying a search condition. The serialized data is constructed by arranging sequence elements corresponding to the respective nodes of the tree structure in the order of the nodes obtained by traversing the tree structure in preorder, and inserting a numerical value corresponding to the number of edges traced back for searching for a subsequent node of a leaf node immediately following a sequence element corresponding to the leaf node. An essential element string identifying part identifies an essential element string that is a sequence element string composed of a series of sequence elements including all the sequence elements corresponding to the identified number of nodes. A rear section identifying part identifies a sequence element string including the sequence elements located after the essential element string, based on a maximum value of the depth of the nodes corresponding to the respective sequence elements included in the essential element string and information of the depth in the tree structure of the nodes corresponding to the respective sequence elements included in the serialized data, so that an addition value of the depth of the nodes corresponding to the sequence elements exceed the maximum value.

Furthermore, embodiments of the invention may be implemented as a method for processing data with a tree structure using a computer. The processing method includes searching serialized data to identify a number of nodes satisfying a search condition, the serialized data constructed by arranging sequence elements corresponding to the respective nodes of the tree structure in the order of the nodes obtained by traversing the tree structure in preorder, and inserting a numerical value corresponding to the number of edges traced back for searching for a subsequent node of a leaf node immediately following a sequence element corresponding to the leaf node; identifying a first sequence element string composed of a series of sequence elements including all the sequence elements corresponding to the identified nodes; identifying a second sequence element string including the sequence elements located after the first sequence element string, based on a maximum value of the depth of the nodes corresponding to the respective sequence elements included in the first sequence element string and information of the depth in the tree structure of the nodes corresponding to the respective sequence elements included in the serialized data, so that an addition value of the depth of the nodes corresponding to the sequence elements exceed the maximum value; identifying a third sequence element string including the sequence elements located before the first sequence element string, based on the information of the depth in the tree structure of the nodes corresponding to the respective sequence elements included in the serialized data, so that the addition value of the depth of the nodes corresponding to the sequence elements is equal to a negative of the addition value of the depth of the nodes corresponding to the sequence elements included in the first sequence element string and the second sequence element string; and identifying a sequence element string corresponding to a subtree including all of the identified nodes, based on the first sequence element string, the second sequence element string, and the third sequence element string.

Embodiments of the invention may also be implemented as a program for causing a computer to realize the functions of the aforementioned device, or as a program for causing a computer to execute processing corresponding to the method. The program may be provided by storing it on a magnetic disk, an optical disk, semiconductor memory, or other recording medium and distributing, or by transmitting through a network.

BRIEF DESCRIPTION OF THE SEVERAL VIEWS OF THE DRAWINGS

FIG. 2 is a diagram illustrating a state of processing the serialized data of the tree structure illustrated in FIG. 1 in accordance with an embodiment;

FIG. 6 is a diagram illustrating a state where processing according to the present embodiment is performed on the serialized data acquired from the tree structure of FIG. 5(a) in accordance with an embodiment;

DETAILED DESCRIPTION

Figure 1:
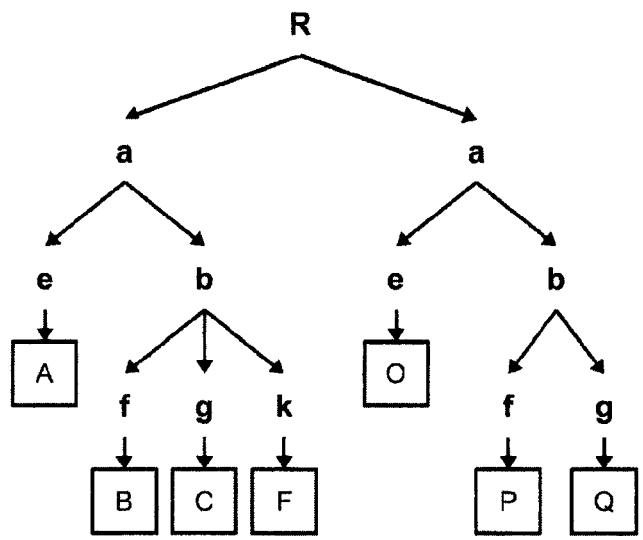
FIG. 1 is a diagram illustrating an example of an XML document structure and serialized data in accordance with an embodiment.

An embodiment of the invention may be realized in a tree structure that can be restored based on the serialized data, thereby enabling extraction of the partial data or subdata that includes information of the tree structure from the original data. Serialized processing is required when transferring a structured document through a network or the like. At this time, however, a part of structure information in the original data is lost. Therefore, in order to acquire a relevant subdocument, means for acquiring, in addition to serialized data, structure information of a portion corresponding to the subdocument based on the structure information of the original data has is required.

However, transferring data (mapping data and the like) representing the structure of the original data, in addition to the serialized data, prevents improvement of transfer efficiency. Therefore, a tree structure based on serialized data may be restored by enabling extraction of partial data or subdata that includes information of the tree structure from the original data.

In addition, a front section identifying part identifies a sequence element string including the sequence elements located before the essential element string, based on the information of the depth in the tree structure of the nodes corresponding to the respective sequence elements included in the serialized data, so that the addition value of the depth of the nodes corresponding to the sequence elements is equal to a negative of the addition value of the depth of the nodes corresponding to the sequence elements included in the sequence element string identified by the rear section identifying part and the essential element string identified by the essential element string identifying part. A subtree identifying part identifies a sequence element string corresponding to a subtree including all of the nodes identified by the searching part, based on the essential element string identified by the essential element string identifying part, the sequence element string identified by the rear section identifying part, and the sequence element string identified by the front section identifying part.

In the aforementioned configuration, the data to be processed may be a structured document written in a structured language. The device further includes a subdocument generating part that restores the tree structure of the subtree based on the sequence element string identified by the subtree identifying part, and generates a subdocument, which is a portion of the structured document corresponding to the subtree. The data to be processed may be a structured document written in a structured language, with a text node added to a node of the tree structure. The searching part searches for text nodes by a keyword search, and identifies nodes in the tree structure that correspond to the searched text nodes. The front section identifying part may not perform the process of identifying the sequence element string if the addition value of the depth of the nodes corresponding to the sequence elements included in the sequence element string identified by the rear section identifying part and in the essential element string identified by the essential element string identifying part is zero.

Serialization of Target Data

An embodiment of the invention is described below in detail while referring to the attached drawings. In this embodiment, a case is described as an example where a keyword search is performed using an XML document as data with a tree structure to extract corresponding text (subdata) as well as a minimal subtree including the text. First, a method of extracting the minimal subtree by the present embodiment is described below. In the present embodiment, an XML document to be searched is serialized and stored. Serialization is performed by separating the tree structure and the text of the XML document. Furthermore, serialization of the tree structure of the XML document is performed by traversing in preorder. Furthermore, in the present embodiment, the serialized data of the tree structure is processed so as to contain the information of the tree structure of the original XML document. The serialization of the XML document by the present embodiment is described below by presenting a specific example.

FIG. 1 is a diagram illustrating an example of an XML document structure and an example of serialized data. FIG. 2 is a diagram illustrating a state of processing the serialized data of the tree structure illustrated in FIG. 1. In the XML document illustrated in FIG. 1(a), node R is a root node, and text nodes (nodes A, B, C, F, O, P, Q) representing text are added to leaf nodes (in the illustrated example, nodes e, f, g, k). Note that in the tree structure illustrated in FIG. 1(a), an edge extends from each leaf node, similarly to other nodes, to which a text node is connected. However, since the text nodes are different from other nodes in that the text nodes are not used to identify the tree structure, a node that does not have a child node other than a text node is referred to as a leaf node.

Data illustrated in FIG. 1(b) (herein after referred to as serialized data) is acquired by serializing the XML document illustrated in FIG. 1(a). As illustrated in FIG. 1(b), the serialized data includes serialized data of the tree structure and serialized data of the text. The serialized data of the tree structure is generated by traversing in preorder the tree structure illustrated in FIG. 1(a), and arranging acquired node names as sequence elements. In the illustrated example, the data "Raebfgkaebfs" is acquired. Furthermore, the serialized data of the text is generated by arranging the text node added to the leaf node of the tree structure as the sequence element in an order where the leaf node is acquired by traversing the tree structure. In the illustrated example, the data "ABCFOPQ" is acquired.

Note that the serialized data of the tree structure illustrated in FIG. 1(b) has only a part of the information contained in the tree structure of the XML document illustrated in FIG. 1(a). In other words, with the serialized data of the tree structure illustrated in FIG. 1(b), there are cases where differing tree structures are expressed by the same serialized data.

Figure 3:
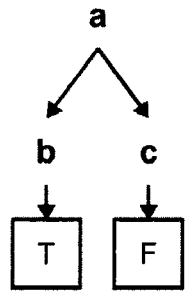
FIG. 3 is a diagram describing a state where a part of the information of the tree structure is lost by the serialization in accordance with an embodiment.
Figure 3:

FIG. 3 is a diagram describing a state where a part of the information of the tree structure is lost by the serialization. Referring to FIG. 3, it can be seen that the tree structure illustrated in FIG. 3(a) and the tree structure illustrated in FIG. 3(b) are converted into serialized data of the same content (in the illustrated example, both are "abc") by simply arranging the nodes acquired by traversing the tree structure in preorder. Therefore, in the present embodiment, the serialized data of the tree structure is processed so that the information required for restoring the tree structure of the XML document is added to the serialized data. Specifically, the information concerning the depth of each node in the tree structure is added to the serialized data.

Figure 4:
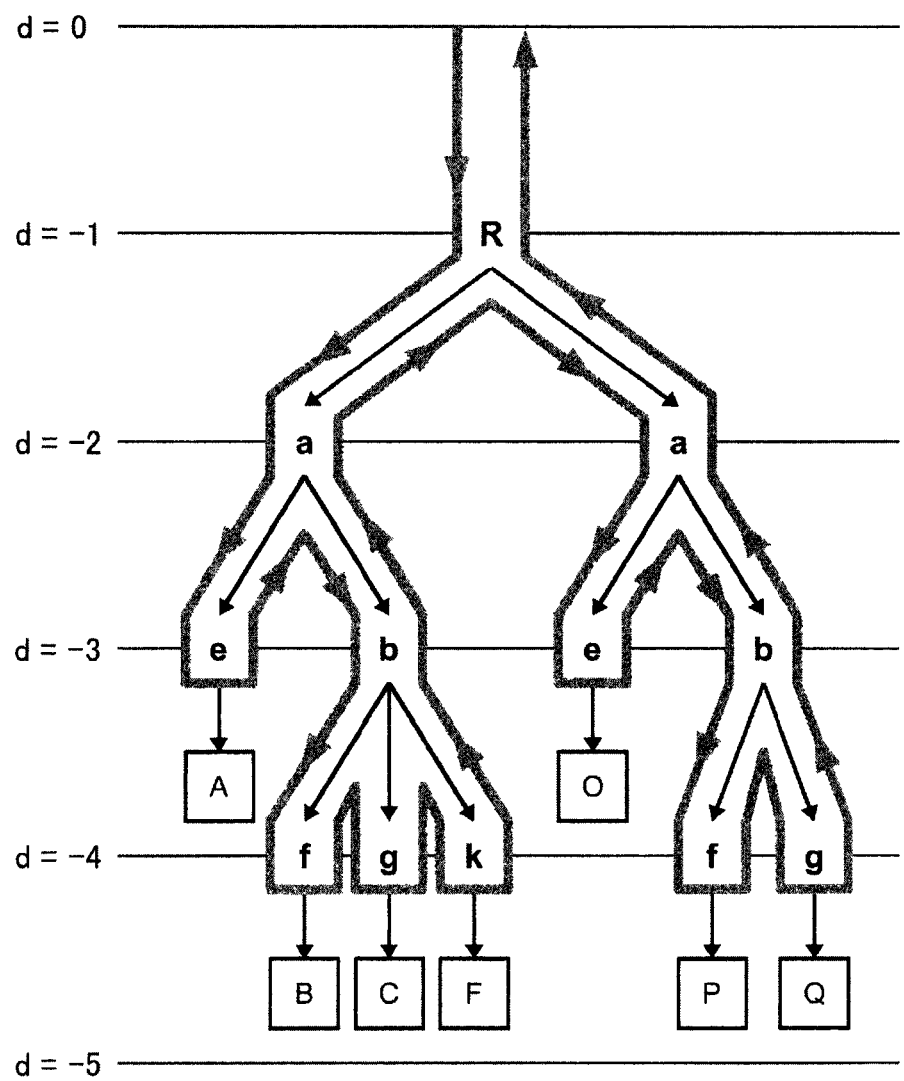
FIG. 4 is a diagram describing the general concept of the depth in the tree structure used by the present embodiment in accordance with an embodiment.

FIG. 4 is a diagram describing the general concept of the depth in the tree structure used by the present embodiment. In the present embodiment, the number of edges in the depth direction of the tree structure is indicated by a numerical value with a minus sign. Furthermore, the depth of the top parent node of the tree structure in focus is −1. For example, when focusing on the entire tree of the tree structure illustrated in FIG. 1(a), the depth d of node R is d=−1 as illustrated in FIG. 4. Therefore, the depth (distance between nodes) of node a with regards to node R is −1. Furthermore, node e has a depth (internodes distance) of −1 with regards to node a, and a depth (internodes distance) of −2 with regards to node R.

Searching the tree structure illustrated in FIG. 4 begins by searching the nodes in preorder, descending downward from a depth of d=0 to node R with a depth of d=−1, and ends when searching of all the nodes in the tree is complete, rising upward from node R (depth d=0).

Next, a method for adding information concerning the depth of each node to the serialized data of the tree structure is described while referring to FIG. 2, as an example of the tree structure illustrated in FIG. 1(a). FIG. 2(a) is similar to the serialized data of the tree structure illustrated in FIG. 1(b). As the tree structure is traversed in preorder, the depth of the tree structure advances by one as a general rule when advancing to the next node. Furthermore, after reaching a leaf node by traversing in preorder, traversing is performed by returning to a node where an untraversed edge remains. For example, in the tree structure illustrated in FIG. 1(a), in order to advance to a subsequent node b from node e, which is a leaf node, advancement to node b is made after returning once to node a. Furthermore, in order to advance to the subsequent node from node k, advancing to node a is performed after returning once to node R. At this time, the depth in the tree structure returns only in an amount equal to the edge that is traced back.

Therefore, in the present embodiment, in order to express advancement or retreat of the depth, (1) each sequence element of the serialized data that corresponds to each node of the tree structure contains the value −1 as depth information, and (2) when tracing back the edges to move to an untraversed edge after reaching a leaf node, the number of the traced back edges is inserted as a sequence element (referred to as numerical value element below) at a corresponding point in the serialized data. For example, when advancing from the aforementioned node e to node b, because an edge is traced back once in order to return to node a, a numerical value 1 is inserted as the numerical value element behind sequence element e. Similarly when advancing from node k to a second node a, because three edges are traced back in order to return to node R, a numerical value 3 is inserted as the numerical value element behind sequence element k.

Furthermore, all nodes included in the tree structure are searched, and after reaching the last leaf node, the search returns to root node R by tracing the edges, but because an untraversed edge does not exist, the search rises one above the root node R, depth d=0, and thus the search is complete. Therefore, (3) a positive numerical value N that corresponds to depth d=−N of the last leaf node in the entire tree structure is inserted as a sequence element (numerical value element) behind the last sequence element. For example, in the tree structure of FIG. 1(a), because the depth of the last leaf node g is d=−4, the numerical value 4 is inserted as the numerical value element. The state where the numerical value elements are inserted in the serialized data of FIG. 2(a) in the manner described above is illustrated in FIG. 2(b).

Note, in the serialized data processed according to the aforementioned (1) through (3), a numerical value element is inserted behind a sequence element that corresponds to a leaf node of the tree structure. In other words, the sequence element immediately preceding the numerical value element corresponds to the leaf node of the tree structure, and corresponds to a text node that is added to the leaf node. Therefore, the location that corresponds to each text node in the serialized data can be clarified by separating the serialized data for each numerical value element. Furthermore, in the present embodiment, regarding the serialized data with the inserted numerical value element as described above, (4) a separator is inserted immediately following each numerical value element other than the numerical value element added behind the last sequence element in (3). For the serialized data of the state in FIG. 2(b), the state where the separator is inserted immediately following the numerical value element is illustrated in FIG. 2(c). Note that because the insertion of the separator is not mandatory, the separator may be omitted depending on the specification of the format of the serialized data.

In the example illustrated in FIG. 2(c), sequence element F that corresponds to text node F of the tree structure illustrated in FIG. 1(a) is located fourth from the left in the serialized data of the text. Therefore, when looking at the fourth numerical value element from the left in the serialized data of the tree structure, a numerical value 3 is inserted. Therefore, it can be seen that node k that corresponds to sequence element k immediately preceding the numerical value 3 is a node where text node F is added to the tree structure of FIG. 1(a).

Restriction of XML Document Structure

In the tree structure of the XML document illustrated in FIG. 1(a), the text node is added to the leaf node. However, in the tree structure of a general XML document, there are cases where the text node is directly added to a node other than the leaf node (this type of structure is allowed).

Figure 5:
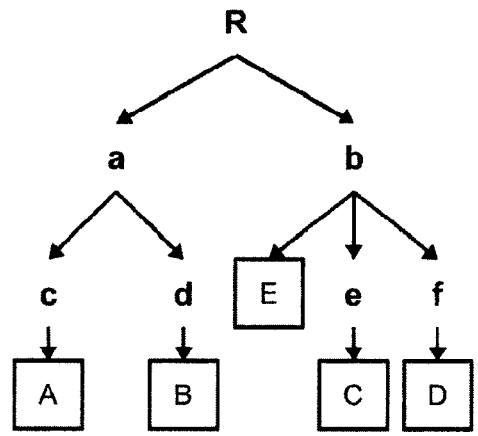
FIG. 5 is a diagram illustrating an example of the tree structure where a text node is added to a node that is not a leaf node in accordance with an embodiment.
Figure 5:
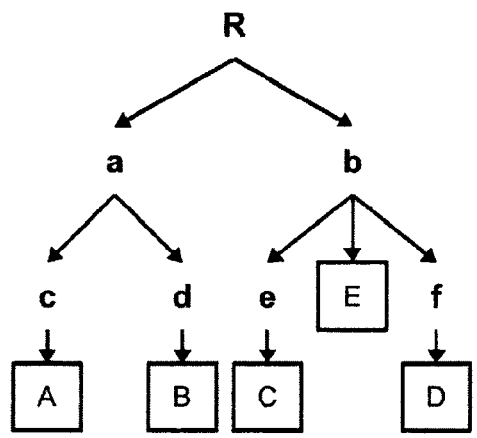
Figure 5:
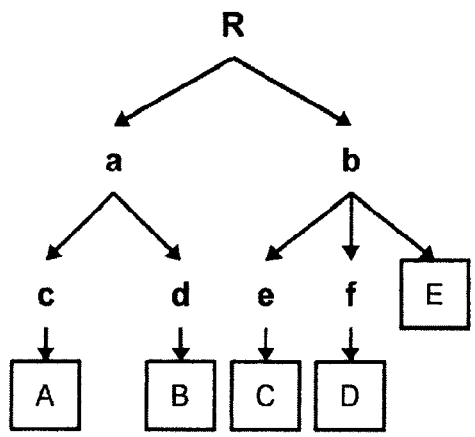

FIG. 5 is a diagram illustrating an example of a tree structure where a text node is added to a node that is not a leaf node. In the examples illustrated in FIG. 5(a) through (c), node b holds node e and node f as child nodes (and is not a leaf node). However, text node E is added to node b. As illustrated in FIG. 5(a) through (c), a case where a text node is added to a node that is not a leaf node occurs only when an edge leading to the text node exists at the left side of edges leading to other nodes as illustrated in FIG. 5(a) for the tree structure applicable to the present embodiment.

Therefore, in the present embodiment, if the text node is added to a node that is not a leaf node in the tree structure, the tree structure is formed such that the edge leading to the text node is located at the left side of edges leading to other nodes. In other words, if the tree structure is the one shown in FIG. 5(b) or FIG. 5(c), the tree structure is converted to the structure shown in FIG. 5(a). Note that a so-called normalized XML document that is generally used in a system for handling XML documents satisfies the aforementioned condition. Therefore, the present embodiment may be applied after the XML document is normalized using a standard method.

Furthermore, if a text node is added to a node that is not a leaf node as described above, (5) a numerical value 0 is inserted as the numerical value element immediately following the sequence element that corresponds to that node in the serialized data, and a separator is inserted immediately following the numerical value of 0. Performing this type of operation indicates that the text node is added to the node that corresponds to the sequence element immediately preceding the numerical value 0, which is the numerical value element separated by the separator. Furthermore, the numerical value of 0 indicates that no edge is traced back to move from that node to a subsequent node (the depth in the tree structure does not change).

Figure 6:
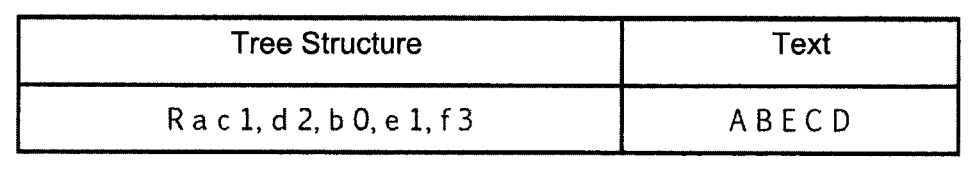

FIG. 6 is a diagram illustrating a state where processes (aforementioned processes (1) through (5)) are performed by the present embodiment in the serialized data acquired from the tree structure in FIG. 5(a). In the example illustrated in FIG. 6, sequence element E that corresponds to text node E is located third from the left in the serialized data of the text. Therefore, looking at the third numerical value element from the left in the serialized data of the tree structure, a numerical value 0 is inserted. Therefore, it can be seen that node b that corresponds to sequence element b immediately preceding the numerical value 0 is a node where text node E is added in the tree structure of FIG. 5(a).

Extraction of Minimal Subtree

Next, a method for extracting a minimal subtree in a range that includes a desired text node is described using the serialized data of the text and the tree structure created as described above. Herein, the minimal subtree is a tree structure (subtree) that contains two identified text nodes and has the minimum number of nodes. In the serialized data of the tree structure created as described above, information concerning the depth in the tree structure is included in each sequence element, so if the sequence elements that correspond to the nodes forming the minimal subtree is identified, the tree structure can be restored based thereon.

As a summary procedure of the present method, first, two sequence elements are identified in the serialized data of the text, and two sequence elements corresponding thereto are identified in the serialized data of the tree structure. These two sequence elements indicate a range of nodes that the minimal subtree to be extracted must include. In other words, the extraction of the minimal subtree by the present embodiment is an operation that extracts a subtree (section that is established as a tree structure) including nodes that correspond to the two sequence elements.

Next, the sequence elements that correspond to all nodes included in the minimal subtree to be extracted is identified, based on the aforementioned two sequence elements and the information concerning the depth added to each sequence element. Specifically, first, the aforementioned two sequence elements and any sequence element located between the two sequence elements are identified. Then, sequence elements that correspond to a minimum number of nodes required to be established as a tree structure, including all the nodes that correspond to the identified sequence elements, are identified. Thereby, a minimal subtree that has a minimum number of nodes is extracted from the subtrees that include nodes corresponding to the aforementioned two sequence elements. The method is described below in detail.

[1] Identification of Two Sequence Elements and Sequence Elements Between them.

First, in the present embodiment, two sequence elements in the serialized data of the text are identified. Thereupon, two sequence elements in the serialized data of the tree structure are identified based on these sequence elements that correspond thereto. Then, sequence elements that are located between these two sequence elements in the serialized data of the tree structure are identified. Thereby, sequence elements that are invariably included in the minimal subtree (tree structure) to be extracted are determined.

For example, the fifth sequence element O and the seventh sequence element Q are identified in the serialized data of the text illustrated in FIG. 2(c). Searching for the sequence elements of the tree structure that correspond thereto finds sequence element e that is located immediately preceding the fifth numerical value element (numerical value 1) and sequence element g that is located immediately preceding the seventh numerical value element (numerical value 4). Then, a sequence element string e1, bf1, g is acquired by adding a series of sequence elements that are interposed between the two sequence elements. The sequence elements included in the sequence element string correspond to nodes invariably included in the minimal subtree to be extracted (this sequence element string is referred to below as an essential element string).

[2] Identification of Sequence Elements Corresponding to Nodes of the Minimal Subtree.

Next, a sequence element string that correspond to the minimal subtree that includes all of the sequence elements are identified based on the information concerning the depth of the tree structure added to each sequence element identified in [1].

Figure 7:
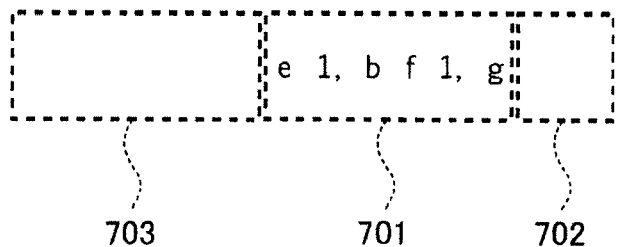
FIG. 7 is a diagram illustrating an image of a sequence element string that corresponds to a minimal subtree that includes an essential element string extracted from the serialized data of the tree structure of FIG. 2(c) in accordance with an embodiment.
Figure 7:
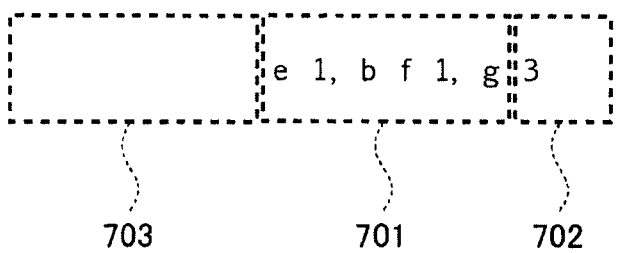
Figure 7:
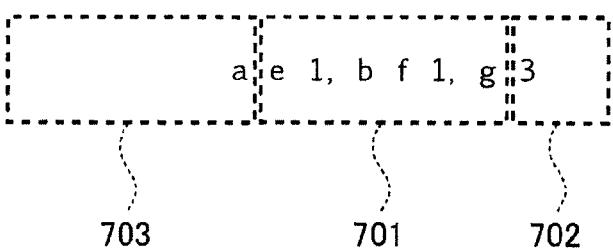

FIG. 7 is a diagram illustrating an image of a sequence element string that corresponds to a minimal subtree that includes an essential element string extracted from the serialized data of the tree structure in FIG. 2(c). As illustrated in FIG. 7(a), in order to extract the sequence elements that form the subtree (section established as a tree structure) from the serialized data of the tree structure, a required sequence element is added to a rear (right side) section 702 of the last (rightmost) sequence element of the essential element string, and to a front (left side) section 703 of the first (leftmost) sequence element of the essential element string, in addition to essential element string 701. A specific method is described below.

[2-1] First, depth values added to the respective sequence elements of the essential element string 701 identified in [1] are added in order from the leftmost element. Furthermore, in conjunction with the calculation of the addition value of all sequence elements, a maximum value max that is expressed in the adding operation is acquired.

In the example above, the depth values added to the sequence elements e1, bf1, and g of the essential element string illustrated in FIG. 7 are added to produce:

$$-1+1-1-1+1-1=-2.$$

Furthermore, because the values obtained by adding in order from the leftmost element are:

$-1+1=0$ $-1+1-1=-1$ $-1+1-1-1=-2$ $-1+1-1-1+1=-1$ $-1+1-1-1+1-1=-2,$ the maximum value max is 0. The maximum value max indicates a maximum value of the height of the subtree that includes a node group that corresponds to each sequence element of the essential element string 701. Note that the maximum value max is a relative value where the depth of sequence element e on the left edge of the essential element string 701 is acquired as −1, and there is no special meaning to the value itself (value of 0 in the example above).

[2-2] Next, a sequence element for configuring the minimal subtree (for establishing as a tree structure) is added to the rear (right side) section 702 of the rightmost sequence element g of the essential element string 701. When traversing the tree structure in preorder, traversing is completed for the right section of the tree when traversing rises higher than the smallest (shallowest) node for the depth in the tree structure. Therefore, the sequence element located on the rear (right side) section 702 of sequence element g is added in order until the addition value becomes a value of one larger than the aforementioned maximum value max.

In the example above, a numerical value element (numerical value 4) exists immediately after sequence element g in the serialized data of the tree structure of FIG. 2(*c*). Herein, the numerical value 4 indicates that four edges are traced back, or can also mean that a value of 1 has occurred four times. Therefore, a value up to a maximum of 4 can be added as needed. Therefore, because the value that is added from the aforementioned sequence element e to the sequence element g is −2 and the maximum value max is 0, the value added to the rear (right side) of sequence element g is 3 (=0+1−(−2)). A state where the numerical value element (numerical value 3) is added to the rear (right side) section 702 of the essential element string illustrated in FIG. 7(*a*) is illustrated in FIG. 7(*b*).

[2-3] Next, a sequence element for configuring the minimum subtree (for establishing as a tree structure) is added to the front (left side) section 703 of the leftmost sequence element e of the essential element string 701. When traversing the tree structure in preorder, traversing is starts from the top node (depth d=−1), searches all of the edges and nodes, and returns to the top node, and traversing is complete after rising higher than the top node (depth d=0). Therefore, when the value for the depth of the sequence elements of the range established as the tree structure is added, the value becomes 0.

Herein, from [2-1] and [2-2], when the value for the depth of the sequence elements included in the essential element string 701 and the value for the depth of the sequence elements included in the rear (right side) section 702 are all added, the value is (maximum value max+1). Therefore, the value that is acquired by adding the value for the depth of the sequence elements included in the front (left side) section 703 of the essential element string 701 is (maximum value max+1).

Note that if the value of (maximum value max+1) acquired from the essential element string 701 and the rear (right side) section 702 is 0, the value acquired by adding the value for the depth of the sequence elements included in the front (left side) section 703 of the essential element string 701 is also 0. Therefore, in this case, the sequence elements included in the front (left side) section 703 of the essential element string 701 are not determined.

In the example above, sequence element a exists immediately preceding sequence element e in the serialized data of the tree structure of FIG. 2(*c*). Therefore, the values for the depth of the sequence elements are added until the value (−(maximum value max+1)) is acquired, when moving forward (to the left) from sequence element a. As determined in [2-1], because the value of maximum value max is 0, the determined value is −1 (=−(0+1)). Herein, the value for the depth of sequence element a is −1. Therefore, the sequence element included in the front (left side) section 703 of the essential element string 701 is only sequence element a. A state where sequence element a is added to the front (left side) section 703 of the essential element string 701 illustrated in FIG. 7(*b*) is illustrated in FIG. 7(*c*).

Thereby, the sequence elements included in the essential element string 701, rear (right side) section 702, and front (left side) section 703 are identified. In other words, identified sequence element string ae1, bf1, g3 is a sequence element string that corresponds to the minimal subtree that includes the nodes that correspond to essential element string 701 (e1, bf1, g).

Restoration of Tree Structure

Herein, the creation of the minimal subtree is possible based on the acquired sequence element string ae1, bf1, g3. The head of the sequence element string ae1, bf1, g3 is sequence element a, so node a that corresponds thereto is the top node in the minimal subtree. The next sequence element is sequence element e, so node e that corresponds thereto is a child node of node a. The next sequence element is a numerical value element (numerical value 1), so node e is a leaf node. Therefore, text node O is added to node e. Furthermore, returning one level, node b that corresponds to the next sequence element b, is the second child node of node a.

Furthermore, node f that corresponds to sequence element f that follows sequence element b is a child node of node b. Because a numerical value element (numerical value 1) follows sequence element f, node f is a leaf node, and text node P is added. Furthermore, returning one level, node g that corresponds to the next sequence element g is the second child node of node b. Because the next sequence element is a numerical value element (numerical value 3), traversing returns 3 levels from node g, and rises above node a, thus completing the tree structure.

Figure 8:
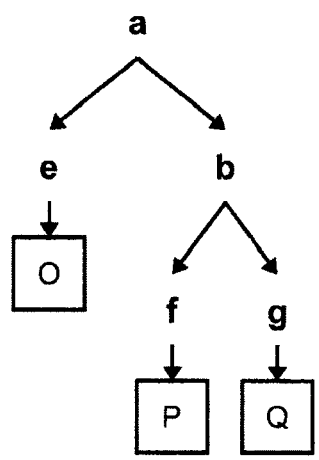
FIG. 8 is a diagram illustrating a structure of the minimal subtree based on the sequence element string illustrated in FIG. 7(c) in accordance with an embodiment.

FIG. 8 is a diagram illustrating a structure of a minimal subtree created as described above, based on the sequence element string illustrated in FIG. 7(*c*). When comparing the tree structure illustrated in FIG. 1(*a*) and the tree structure illustrated in FIG. 8, it can be seen that the tree structure illustrated in FIG. 8 is the minimal subtree including nodes e and g (text nodes O and Q), of the tree structure illustrated in FIG. 1(*a*).

System Configuration Example

Figure 9:
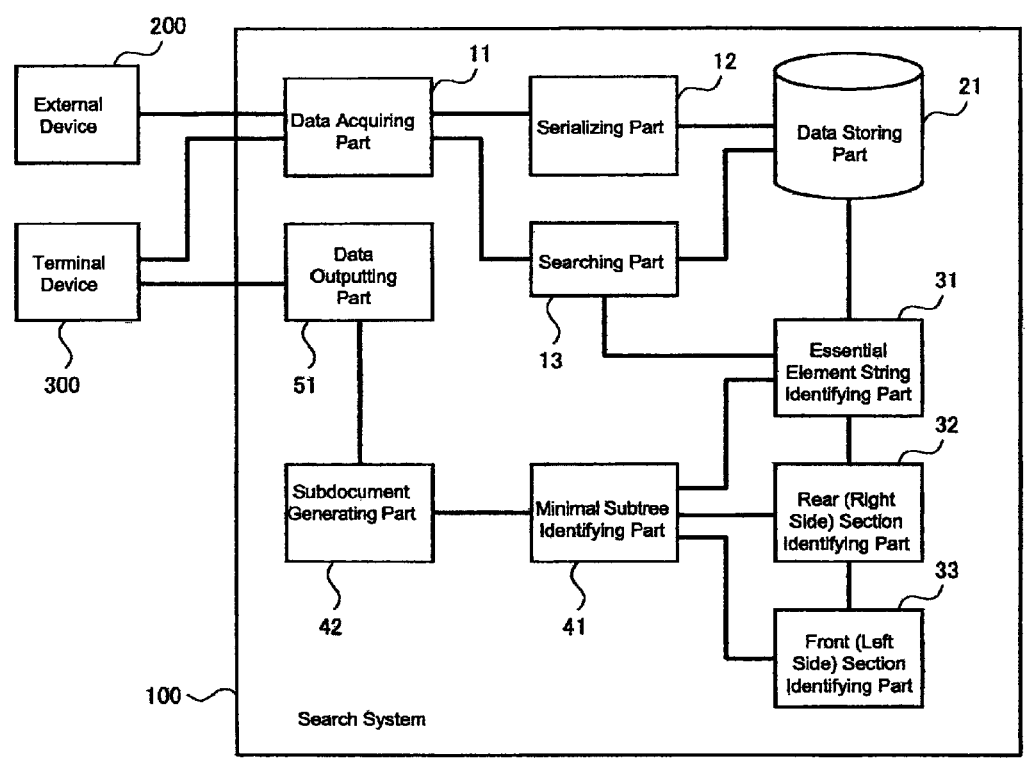
FIG. 9 is a diagram illustrating an example of system configuration in accordance with an embodiment.

Next, a search system for XML documents is described that applies a method for extracting the minimal subtree using the present embodiment. FIG. 9 is a diagram illustrating an example of a system configuration. A search system 100 illustrated in FIG. 9 provides a data acquiring part 11, a serializing part 12, a searching part 13, and a data storing part 21. Furthermore, an essential element string identifying part 31, a rear (right side) section identifying part 32, a front (left side) section identifying part 33, a minimal subtree identifying part 41, a subdocument generating part

42, and a data outputting part 51 are provided as means for extracting the minimal subtree.

The data acquiring part 11 acquires an XML document to be searched from an external device 200 for example. Furthermore, the data acquiring part 11 acquires a search request that includes a search keyword that is used in a keyword search from a terminal device 300 that is used by a user of the search system 100 for example. The external device 200 or the terminal device 300 is connected through a network for example to the search system 100.

The serializing part 12 serializes the XML document acquired by the data acquiring part 11, and processes the serialized data of the tree structure, as described while referring to FIG. 1, FIG. 2, and FIG. 6. The serialized data created by the serializing part 12 is stored in the data storing part 21. The data storing part 21 maintains the serialized data (serialized data of the tree structure, and serialized data of the text) of the stored XML document as an object to be processed.

Note that rather than generating the serialized data from the XML document to be processed by the serializing part 12, the serialized data generated by separately serializing according to the present embodiment in an external device may be acquired by the data acquiring part 11 and stored in the data storing part 21. In this case, the serializing part 12 does not need to be provided in the search system 100.

The searching part 13 performs a keyword search for the XML document stored in the data storing part 21 by using a search keyword included in the search request acquired by the data acquiring part 11. The search target is the serialized data of the text. Any existing method for searching plain text can be used as the search method. Text nodes that include keywords (satisfy search conditions) are detected by the search.

The essential element string identifying part 31 identifies sequence elements of the nodes that correspond to the detected text nodes from the serialized data of the tree structure stored in the data storing part 21, based on the text nodes detected by the searching part 13. Furthermore, the sequence element string (essential element string) that contains a series of sequence elements including all of the identified sequence elements is identified. The process of the essential element string identifying part 31 is described below in detail.

Herein, a case is considered where three or more text nodes are detected by the searching part 13 (case where there are three or more text nodes that include the search keyword). In this case, any text node other than the leftmost (first) text node and the rightmost (last) text node in the serialized data from the detected text nodes is invariably included in the minimal subtree that include the leftmost and rightmost text nodes. Therefore, if three or more text nodes are detected by the searching part 13, identification of the essential element string is required based on the text nodes on both ends in the serialized data, from the detected text nodes. For example, in the serialized data of the text illustrated in FIG. 2(*c*), if sequence elements C, O, and P are detected by a keyword search, the essential element string is identified based on the leftmost sequence element C and the rightmost sequence element P.

The rear (right side) section identifying part 32 identifies the rear (right side) section of the essential element string required for forming the minimal subtree, based on the essential element string identified by the essential element string identifying part 31, and the information concerning the depth added to each sequence element of the serialized data of the tree structure, as described while referring to FIG. 7. Herein, the rear (right side) section identifying part 32 identifies the sequence element string of the rear (right side) section so that the addition value of the depth of the nodes that correspond to the sequence elements exceeds the maximum value of the depth in the essential element string, based on the information concerning the depth of the nodes that correspond to the sequence elements located after (right side of) the essential element string. The process of the rear (right side) section identifying part 32 is described below in detail.

The front (left side) section identifying part 33 identifies the front (left side) of the essential element string required for forming the minimal subtree, based on the essential element string identified by the essential element string identifying part 31, the rear (right side) section of the essential element string identified by the rear (right side) section identifying part 32, and the information concerning the depth added to each sequence element of the serialized data of the tree structure, as described with reference to FIG. 7. Herein, the front (left side) section identifying part 33 identifies the sequence element string of the front (left side) section so that the addition value for the depth of the nodes that correspond to the sequence elements becomes equal to the addition value with the minus sign for the depth of the nodes that correspond to the sequence elements included in the essential element string and in the sequence element string of the rear (right side) section, based on the information concerning the depth of the nodes that correspond to the sequence elements located before (left side of) the essential element string. The process of the front (left side) section identifying part 33 is described below in detail. Note that there are cases where the front (left side) section of the essential element string is not identified by the structure of the desired minimal subtree, as described above.

The minimal subtree identifying part 41 identifies the sequence element string that corresponds to the minimal subtree by combining the essential element string, the sequence element string of the rear (right side) section, and the sequence element string of the front (left side) section, which are identified by the essential element identifying part 31, the rear (right side) section identifying part 32, and the front (left side) section identifying part 33, respectively.

The subdocument generating part 42 restores the tree structure of the minimal subtree based on the sequence element string that corresponds to the minimal subtree identified by the minimal subtree identifying part 41, and generates the XML document (subdocument) based on the minimal subtree, based on the tree structure and the corresponding text nodes. As described while referring to FIG. 9, in the present embodiment, a tree structure (subtree) can be generated based on the sequence element string extracted from the serialized data of the tree structure. Therefore, a subdocument can be obtained without affecting the format of the original XML document.

The data outputting part 51 returns the subdocument generated by the subdocument generating part 42 as a response to the terminal device 300 that transmitted the search request. Note that in the example of the configuration illustrated in FIG. 9, in the search system 100, the subdocument is generated based on the search request, but according to the present embodiment, restoration of the tree structure from the serialized data may be performed by the terminal device 300. In this case, the subdocument generating part 42 is not provided, and the data outputting part 51 transmits to the terminal device 300 the serialized data of the text and the serialized data of the tree structure identified by the minimal subtree identifying part 41.

Figure 10:
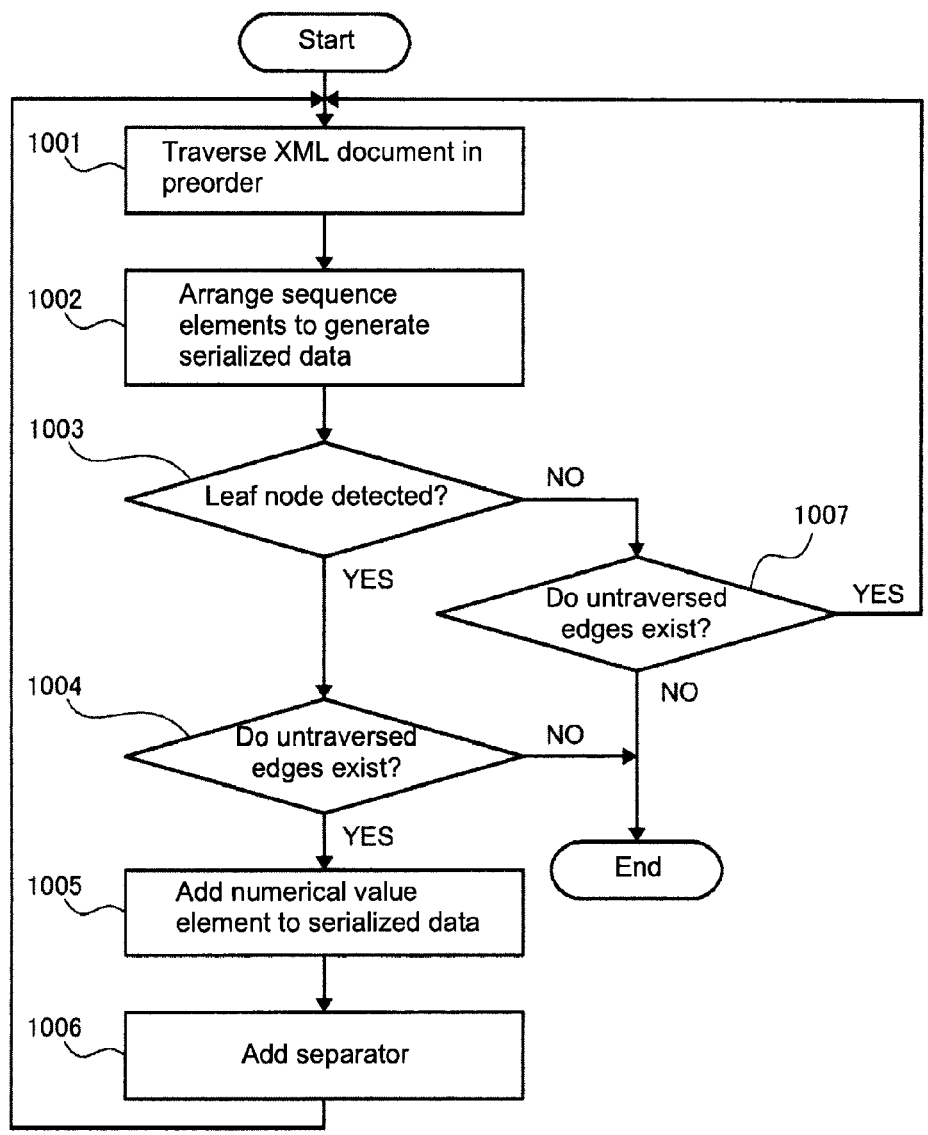
FIG. 10 is a flow chart depicting an example of processing the serialized data of the tree structure using a serializing part in accordance with an embodiment.

FIG. 10 is a flow chart depicting an example of processing serialized data of the tree structure using the serializing part 12. First, the serializing part 12 searches by traversing the tree structure of the XML document to be processed in preorder (block 1001), serially arranges the sequence elements that correspond to the detected nodes to generate the serialized data (block 1002).

If the node detected in block 1002 is a leaf node (Yes in block 1003), then, the serializing part 12 determines whether or not any untraversed edge exists. If an untraversed edge exists (Yes in block 1004), the number of edges that were passed when returning to a node where the untraversed edge exists is added to the serialized data as a numerical value element (block 1005). Furthermore, a separator is added immediately following the added numerical value element (block 1006). Then, the process returns to block 1001, and continues searching for a node.

If the node detected in block 1002 is not a leaf node (No in block 1003), then, the serializing part 12 determines whether or not any untraversed edge exists. If an untraversed edge exists (Yes in block 1007), the process returns to block 1001, and continues searching for a node.

If an untraversed edge does not exist (No in block 1004 or block 1007), searching for all nodes is complete, so the serializing part 12 terminates the process.

Operations of Essential Element String Identifying Part, Rear (Right Side) Section Identifying Part, and Front (Left Side) Section Identifying Part.

Next, the process for identifying the sequence element string by the essential element string identifying part 31, the rear (right side) section identifying part 32, and front (left side) section identifying part 33 is described. In the following description, the identified essential element strings are Sm through Sn (the leftmost sequence element of the essential element string in the serialized data is Sm, and the rightmost sequence element is Sn), and the depth of sequence element Sx is d(Sx). Herein, x is a variable that indicates the location of the sequence element (assuming the number of sequence elements in the serialized data is X, then, x=1~X, and 1≤m<n≤X). It should be appreciated that the symbol "~" generally indicates the existence of a range. The statement x=1~X, for example, will be understood to indicate that the variable "x" is equal to a value in the range from "1" to "X." In some cases, a pair of the symbols "~" may alternatively be used to indicate a range. For this example, the statement "x~1~X" may also be used to indicate that "x" is equal to a value in the range from "1" to "X."

Figure 11:
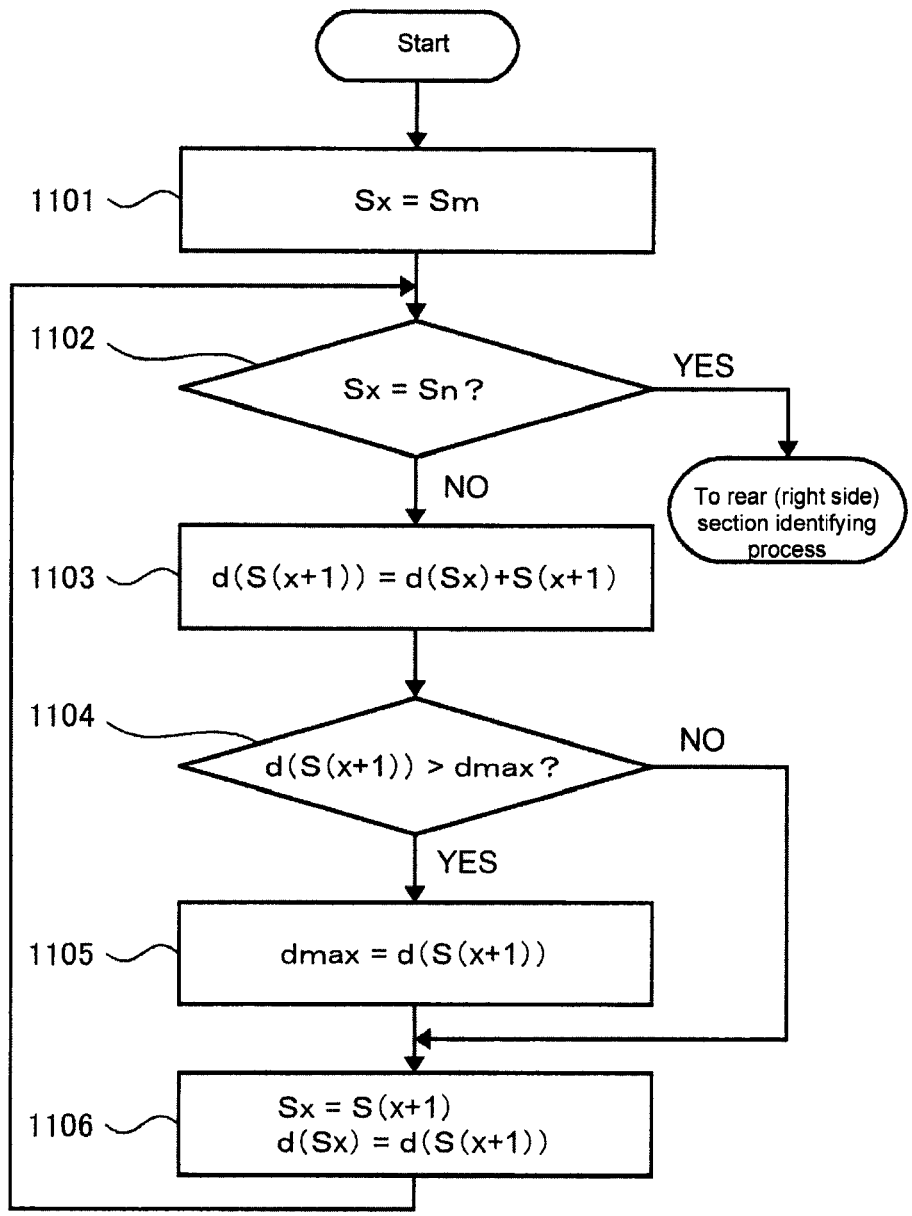
FIG. 11 is a flow chart depicting an example of a process for identifying an essential element string using an essential element string identifying part in accordance with an embodiment.

FIG. 11 is a flow chart depicting an example of the process for identifying an essential element string using the essential element string identifying part 31. The essential element string is already identified by identifying sequence elements Sm and Sn. Therefore, the process that relates to the value for the depth that is required for the process of the rear (right side) section identifying part 32 is described below.

First, the essential element string identifying part 31 establishes that Sx=Sm (blocks 1101 and 1102), and determines the value for the depth of S(x+1) (block 1103). Herein, the value for the depth attached to the subsequent sequence element S(x+1) is added to the value d(Sx) of the current depth. Specifically, if sequence element S(x+1) is a sequence element that corresponds to a node of the tree structure, −1 is added to the value d(Sx) of the current depth. On the other hand, if sequence element S(x+1) is a numerical value element, the value of the numerical value element is added to the value d (Sx) of the current depth.

Next, the essential element string identifying part 31 compares the maximum value dmax for the depth up to this point, and the depth d(S(x+1)) of the sequence element S(x+1). Furthermore, if d(S(x+1)) is not greater than dmax (No in block 1104), the current dmax is maintained, and if d(S(x+1)) is greater than dmax (Yes in block 1104), dmax=d(S(x+1)) (block 1105). Initially, x=m as described above, so if d(S(m+1)) is not greater than d(Sm) (No in block 1104), dmax=d(Sm). On the other hand, if d(S(m+1)) is greater than d(Sm) (Yes in block 1104), dmax=d(S(m+1)) (block 1105).

Next, the essential element string identifying part 31 replaces x+1 with x, and establishes that Sx=S(x+1) and d(Sx)=d(S(x+1)) (block 1106). The process then returns to block 1102, and the process above is repeated until Sx=Sn. Furthermore, if Sx=Sn, the process by the essential element string identifying part 31 is terminated, and processing by the rear (right side) section identifying part 32 is performed.

Figure 12:
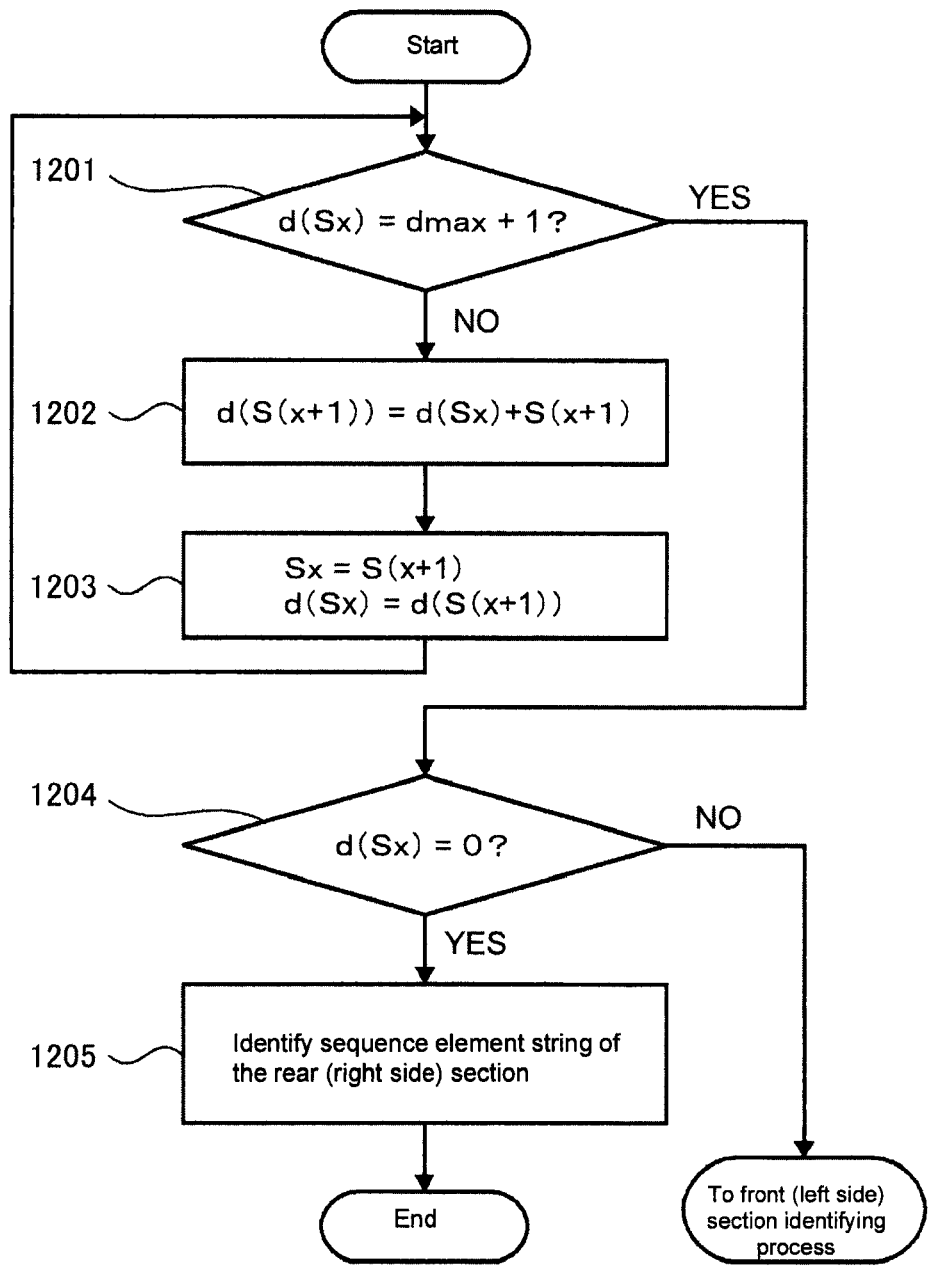
FIG. 12 is a flow chart depicting an example of a process for identifying a sequence element string of a rear (right side) section of the essential element string using a rear (right side) section identifying part in accordance with an embodiment.

FIG. 12 is a flow chart depicting an example of the process for identifying the sequence element string of the rear (right side) section of the essential element string using the rear (right side) section identifying part 32. First, the rear (right side) section identifying part 32 determines whether or not the value d(Sx) for the current depth is larger than the maximum value dmax for the depth (block 1201) by one. Initially, d(Sx)=d(Sn), so d(Sx) does not equal dmax+1 (No in block 1201).

If d(Sx)≠dmax+1, the rear (right side) section identifying part 32 determines the value for the depth of S(x+1) similar to block 1103 of FIG. 11 (block 1202). However, if S(x+1) is a numerical value element, that numerical value is analyzed as needed, and the numerical value is added such that d(S(x+1))=dmax+1. Furthermore, the rear (right side) section identifying part 32 replaces x+1 with x, and establishes that Sx=S(x+1) and (Sx)=d(S(x+1)) (block 1203). The process then returns to block 1201, and the aforementioned process is repeated until d(Sx)=dmax+1.

If d(Sx)=dmax+1, then, the rear (right side) section identifying part 32 determines whether or not the value of d(Sx) is 0 (block 1204). If d(Sx)=0, the process by the front (left side) section identifying part 32 is not required, so sequence element S (n+1)~Sp of x=n+1~p (p: n+1≤p≤X) are identified as the sequence element string of the rear (right side) section, and the process is terminated (block 1205). On the other hand, if d(Sx)≠0, the process by the rear (right side) section identifying part 32 is terminated, and processing by the front (left side) section identifying part 33 is performed.

Figure 13:
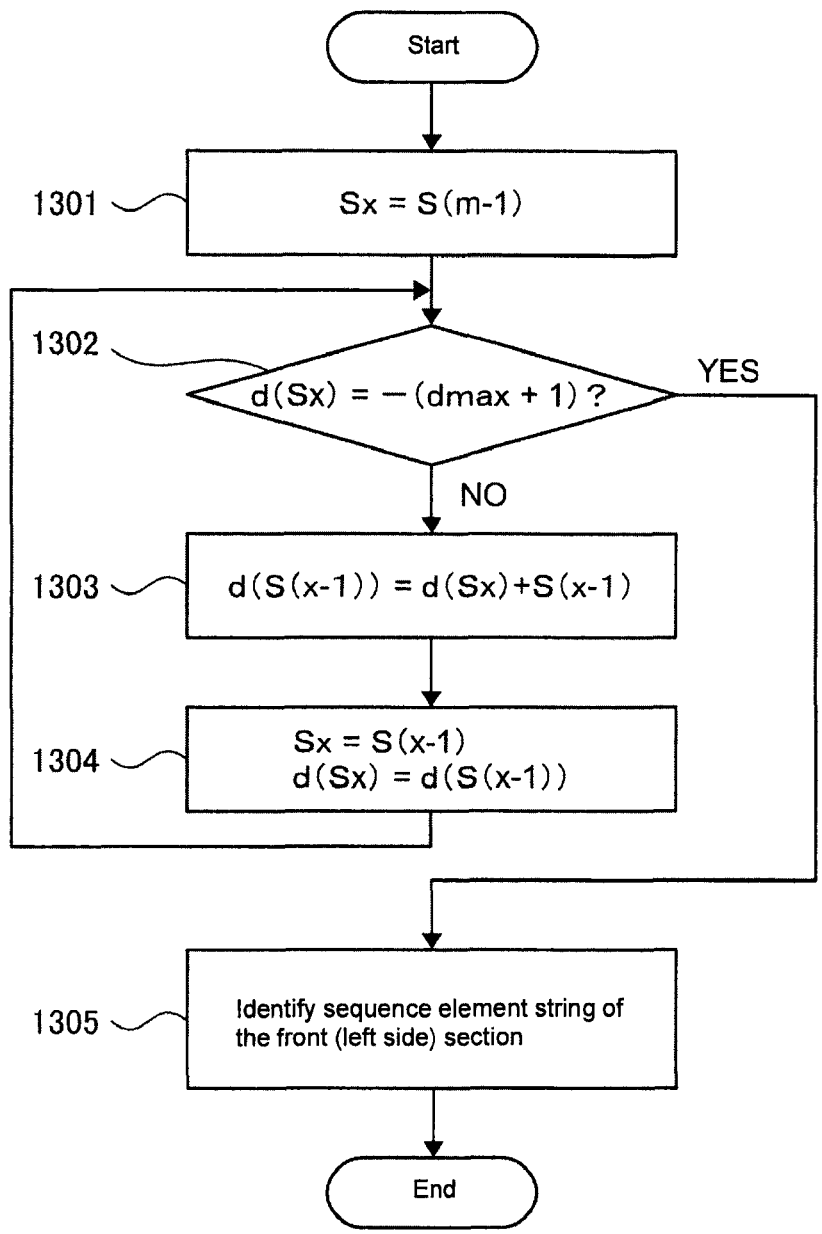
FIG. 13 is a flow chart depicting an example of a process for identifying a sequence element string of a front (left side) section of the essential element string using a front (left side) section identifying part in accordance with an embodiment.

FIG. 13 is a flow chart depicting an example of the process for identifying the sequence element string of the front (left side) section of the essential element string using the front (left side) section identifying part 33. First, the front (left side) section identifying part 33 uses sequence element Sx=S(m−1) (block 1301), and determines whether or not the value d(Sx) for the depth is equal to −(dmax+1) (block 1302).

If d(Sx)≠−(dmax+1), the front (left side) section identifying part 33 determines the value for the depth of sequence element S(x−1) (block 1303). Herein, the value for the depth that is attached to the preceding sequence element S(x−1) is added to value d(Sx) of the current depth. Specifically, if sequence element S(x−1) is a sequence element that corresponds to a node of the tree structure, −1 is added to the value d(Sx) of the current depth. On the other hand, if sequence element S(x−1) is a numerical value element, the value of the numerical value element is added to the value d(Sx) of the current depth.

Furthermore, the front (left side) section identifying part 33 replaces x−1 with x, and establishes that Sx=S(x−1) and d(Sx)=d(S(x−1)) (block 1304). The process then returns to block 1302, and the aforementioned processing is repeated until d(Sx)=−dmax+1. If d(Sx)=−(dmax+1), sequence elements Sq~S(m−1) of x=q~m−1 (q: 1≤q≤m−1) are identified as the sequence element string of the front (left side) section, and the process is terminated.

Therefore, essential element string Sm~Sn, sequence element string S(n+1)~Sp of the rear (right side) section, and sequence element string Sq~S(m−1) of the front (left side) section were obtained. The minimal subtree identifying part 41 identifies sequence element string Sq~Sp(Sq~S(m−1), Sm~Sn, S(n+1)~Sp) corresponding to the minimal subtree by combining these sequence element strings.

Note that the operation of the aforementioned essential element string identifying part 31, rear (right side) section identifying part 32, and front (left side) section identifying part 33 is only an example, and is not limited to the aforementioned processing procedure. For example, the information concerning the depth of each sequence element of the essential element string and the maximum value thereof is required in the process of the rear (right side) section identifying part 32, so the rear (right side) section identifying part 32 may perform the calculation. In addition, embodiments of the invention may vary form the specific processes and procedures described below.

Hardware Configuration Example

Figure 14:
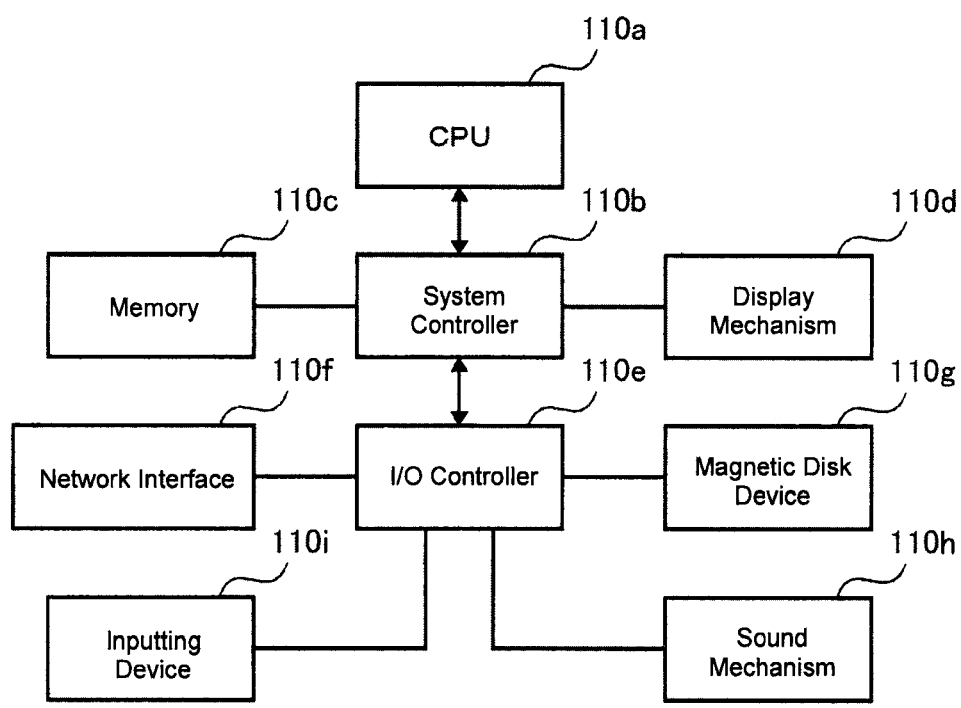
FIG. 14 is a diagram illustrating an example of a preferred computer hardware structure for configuring a search system in accordance with an embodiment.

FIG. 14 is a diagram illustrating an example of a favorable computer hardware structure for configuring the search system 100 of the present embodiment. The computer illustrated in FIG. 14 is equipped with a CPU (Central Processing Unit) 110a, which is operating means, and a memory 110c, which is main storing means. Furthermore, a magnetic disk device (HDD: Hard Disk Drive) 110g, a network interface 110f, a display mechanism 110d, a sound mechanism 100h, an inputting device 110i such as a keyboard or mouse, and the like are provided as external devices.

In the example of the configuration illustrated in FIG. 14, the memory 110c and display mechanism 110d are connected to the CPU 110a through a system controller 110b. Furthermore, the network interface 110f, the magnetic disk device 110g, the sound mechanism 110h, and the inputting device 110i are connected to the system controller 110b through an I/O controller 110e. Each element is connected by a suitable bus such as a system bus, an input-output bus, or the like.

Note that FIG. 14 merely exemplifies a favorable hardware configuration of the computer in order to apply the present embodiment. The present embodiment can be widely applied to information processing systems that process structured documents (data) with tree structures such as XML documents and the like, and the present embodiment is not restricted to only the configuration in the drawings.

In FIG. 14, programs such as an OS and application software are stored in the magnetic disk device 110g. Furthermore, various functions, including the serializing part 12, the searching part 13, the essential element string identifying part 31, the rear (right side) section identifying part 32, the front (left side) section identifying part 33, the minimal subtree identifying part 41, and the subdocument generating part 42, are implemented by reading these programs into the memory 110c, and executing by CPU 110a. Furthermore, the data storing part 21 is achieved by storing means such as the magnetic disk device 110g, the memory 110c, or the like, and the data acquiring part 11 and the data inputting part 51 are achieved by the network interface 110f.

Application Example

The search system of the present embodiment is not restricted to the one for the XML document in the aforementioned description, can be applied widely to process other structured documents (data) with a tree structure to extract a minimal subtree that includes a number of identified nodes in the tree structure and generate a subdocument.

Furthermore, in the aforementioned embodiment, first the search system targets processing of the XML document, identifies text nodes as nodes that form a minimal subtree, and then identifies nodes (mainly leaf nodes) of the tree structure that corresponds thereto. However, the search system of the present embodiment generally can be achieved as a system that extracts a minimal subtree that includes a number of identified nodes from data with a tree structure.

Furthermore, the present embodiment can be applied when detecting a lowest common ancestor node for a number of identified nodes in a tree structure, in the various data with tree structures. For example, if the present embodiment is applied to a file system that hierarchically manages data files, the bottom folder can be found from common folders including a number of files identified by given conditions.

What is claimed is:

1. A device for processing data with a tree structure, the device comprising:
   a memory having computer readable instructions; and
   a processor for executing the computer readable instructions, the computer readable instructions including:
   a searching part that searches serialized data to identify a plurality of nodes satisfying a search condition, the serialized data constructed by arranging sequence elements corresponding to the respective nodes of the tree structure in the order of the nodes obtained by traversing the tree structure in preorder, and inserting a numerical value corresponding to a number of edges traced back for searching for a subsequent node of a leaf node immediately following a sequence element corresponding to the leaf node;
   an essential element string identifying part that identifies an essential element string that is a sequence element string composed of a series of sequence elements including all the sequence elements corresponding to the identified plurality of nodes;
   a rear section identifying part that identifies a sequence element string including the sequence elements located after the essential element string, based on a maximum value of a depth of the nodes corresponding to the respective sequence elements included in the essential element string and information of a depth in the tree structure of the nodes corresponding to the respective sequence elements included in the serialized data, so that an addition value of the depth of the nodes corresponding to the sequence elements exceed the maximum value;
   a front section identifying part that identifies a sequence element string including the sequence elements located before the essential element string, based on the information of the depth in the tree structure of the nodes corresponding to the respective sequence elements included in the serialized data, so that the addition value of the depth of the nodes corresponding to the sequence elements is equal to a negative of the addition value of the depth of the nodes corresponding to the sequence elements included in the sequence element string identified by the rear section identifying part and the essential element string identified by the essential element string identifying part; and a subtree identifying part that identifies a sequence element string corresponding to a subtree including all of the plurality of nodes identified by the searching part, based on the essential element string identified by the essential element string identifying part, the sequence element string identified by the rear section identifying part, and the sequence element string identified by the front section identifying part.

2. The device according to claim 1, wherein the data subject to processing is a structured document written in structured language, and the device further comprises:

a subdocument generating part that restores the tree structure of the subtree based on the sequence element string identified by the subtree identifying part, and generates a subdocument, which is a section that corresponds to the subtree of the structured document.

3. The device according to claim 1, wherein the data subject to processing is the structured document written in structured language and a text node is added to the tree structure, and the searching part searches for the text nodes by keyword search, and identifies nodes in the tree structure that correspond to the searched text nodes.

4. The device according to claim 1, wherein the front section identifying part that does not perform the process of identifying the sequence element string if the addition value is 0 for the depth of the node that corresponds to the sequence element included in the sequence element string identified by the rear section identifying part and in the essential element string identified by the essential element string identifying part.

5. A method of processing data with a tree structure, comprising:

searching, by a processor, serialized data to identify a plurality of nodes satisfying a search condition, the serialized data constructed by arranging sequence elements corresponding to the respective nodes of the tree structure in the order of the nodes obtained by traversing the tree structure in preorder, and inserting a numerical value corresponding to a number of edges traced back for searching for a subsequent node of a leaf node immediately following a sequence element corresponding to the leaf node;

identifying, by the processor, a first sequence element string composed of a series of sequence elements including all the sequence elements corresponding to the identified plurality of nodes;

identifying, by the processor, a second sequence element string including the sequence elements located after the first sequence element string, based on a maximum value of a depth of the nodes corresponding to the respective sequence elements included in the first sequence element string and information of a depth in the tree structure of the nodes corresponding to the respective sequence elements included in the serialized data, so that an addition value of the depth of the nodes corresponding to the sequence elements exceed the maximum value;

identifying, by the processor, a third sequence element string including the sequence elements located before the first sequence element string, based on the information of the depth in the tree structure of the nodes corresponding to the respective sequence elements included in the serialized data, so that the addition value of the depth of the nodes corresponding to the sequence elements is equal to a negative of the addition value of the depth of the nodes corresponding to the sequence elements included in the first sequence element string and the second sequence element string; and identifying, by the processor, a sequence element string corresponding to a subtree including all of the identified plurality of nodes, based on the first sequence element string, the second sequence element string, and the third sequence element string.

6. The method of claim 5, further comprising transmitting, via a network, the subtree identifying part to a second processor, wherein the second processor restores the tree structure of the subtree based on the subtree identifying part, and generates a subdocument, which is a section that corresponds to the subtree of the structured document.

7. A computer program product for processing data with a tree structure, the computer program product comprising a non-transitory computer readable storage medium having program code embodied therewith, the program code executable by a computer to perform a method comprising:

searching serialized data to identify a plurality of nodes satisfying a search condition, the serialized data constructed by arranging sequence elements corresponding to the respective nodes of the tree structure in the order of the nodes obtained by traversing the tree structure in preorder, and inserting a numerical value corresponding to a number of edges traced back for searching for a subsequent node of a leaf node immediately following a sequence element corresponding to the leaf node;

identifying a first sequence element string composed of a series of sequence elements including all the sequence elements corresponding to the identified plurality of nodes;

identifying a second sequence element string including the sequence elements located after the first sequence element string, based on a maximum value of a depth of the nodes corresponding to the respective sequence elements included in the first sequence element string and information of a depth in the tree structure of the nodes corresponding to the respective sequence elements included in the serialized data, so that an addition value of the depth of the nodes corresponding to the sequence elements exceed the maximum value;

identifying a third sequence element string including the sequence elements located before the first sequence element string, based on the information of the depth in the tree structure of the nodes corresponding to the respective sequence elements included in the serialized data, so that the addition value of the depth of the nodes corresponding to the sequence elements is equal to a negative of the addition value of the depth of the nodes corresponding to the sequence elements included in the first sequence element string and the second sequence element string; and identifying a sequence element string corresponding to a subtree including all of the identified plurality of nodes, based on the first sequence element string, the second sequence element string, and the third sequence element string.

* * * * *